W. T. PURSGLOVE.
WHEEL HUB.
APPLICATION FILED DEC. 18, 1911.
1,021,476. Patented Mar. 26, 1912.
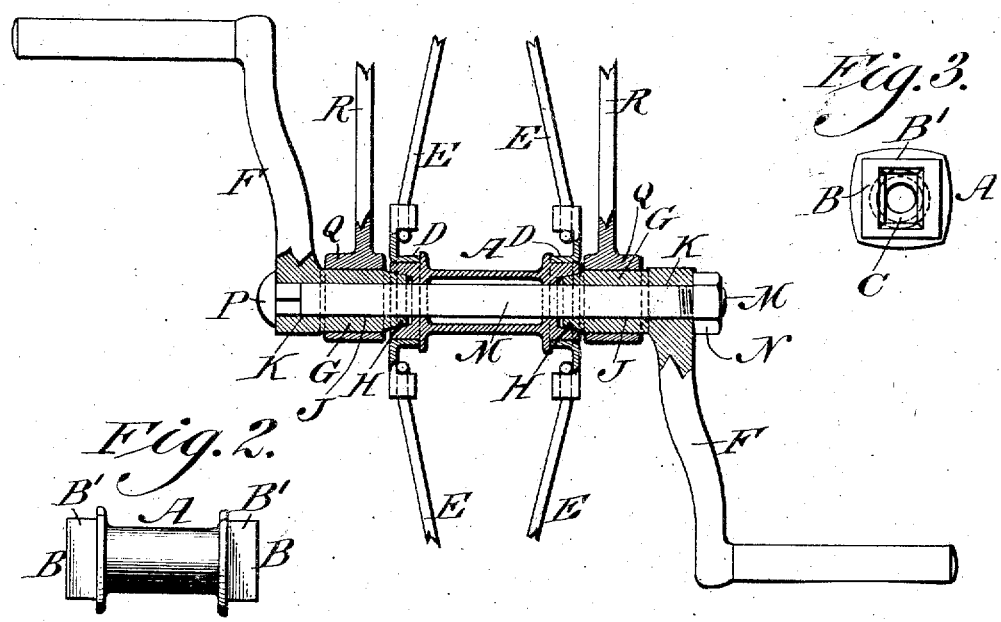
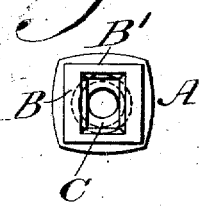
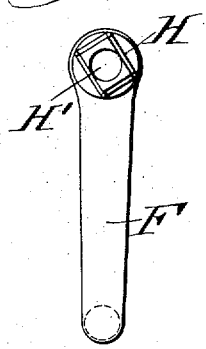
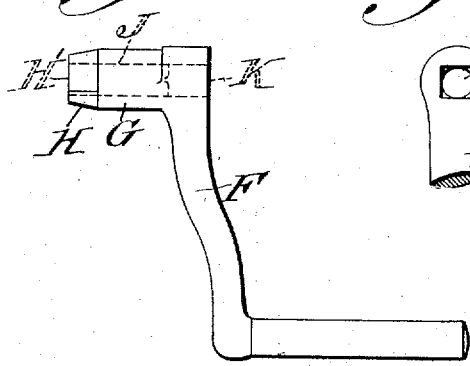
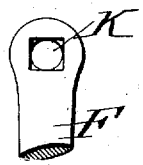
WITNESSES
L. Douville,
P. F. Nagle.
INVENTOR
William T. Pursglove
BY
Niedersheim + Fairbanks
ATTORNEYS

UNITED STATES PATENT OFFICE.

WILLIAM T. PURSGLOVE, OF PHILADELPHIA, PENNSYLVANIA, ASSIGNOR TO THE A. MECKY COMPANY, A CORPORATION OF PENNSYLVANIA.

WHEEL-HUB.

1,021,476. Specification of Letters Patent. Patented Mar. 26, 1912.

Application filed December 18, 1911. Serial No. 666,518.

*To all whom it may concern:*

Be it known that I, WILLIAM T. PURSGLOVE, a subject of the King of Great Britain, residing in the city and county of Philadelphia, State of Pennsylvania, have invented a new and useful Wheel-Hub, of which the following is a specification.

My invention consists of a wheel hub having a barrel or a hub member proper, and cranks fitted thereto and adapted to be interlocked therewith and bound together by a bolt common to said parts, forming a comparatively one piece construction of less weight and expense than heretofore, the parts being adapted to be readily dismantled for packing, storing, and shipping, and as easily assembled.

The invention is satisfactorily illustrated in the accompanying drawing, but the important instrumentalities thereof may be varied, and so it is to be understood that the invention is not limited to the specific arrangement and organization shown and described.

Figure 1 represents a partial side elevation and partial transverse section of a wheel hub embodying my invention. Fig. 2 represents a side elevation of the hub member proper detached. Fig. 3 represents an end view of said member. Fig. 4 represents a side elevation of one of the cranks detached. Fig. 5 represents a side view of said crank at a right angle to Fig. 4. Fig. 6 represents a side elevation of a portion of said crank on the side opposite to Fig. 5.

Similar letters of reference indicate corresponding parts in the figures.

Referring to the drawings:—A designates the hub members formed preferably of sheet steel, the same being tubular or hollow throughout, its ends comprising shoulders B which are angular on their exteriors as at B' and interiorly angular and tapering forming sockets, as most plainly shown in Figs. 1 and 3. On the exterior of said shoulders B are tightly fitted the sleeves D which carry the spokes E of the wheel, the inner walls of said sleeve being angular so as to accord with the angular walls of said shoulders, whereby rotation of said sleeve on said shoulders is prevented.

F designates the cranks of the wheel, the same having on the inner ends of the limbs G, the conical noses H which exteriorly are angular and adapted to enter the interiorly angular end sockets C of the shoulders B, said noses H being tubular or hollow throughout, their bores H' registering with the openings J in the limbs G and openings K in the adjacent ends of the cranks.

M designates a bolt which is passed through the openings K, the openings J, the bores H' of the noses H, the shoulders B, and the body or barrel of the hub member A, and has on its threaded end the nut N, its other end having a head P which bears against one of the cranks F, while said nut N bears against the opposite crank.

The limbs G of the cranks are mounted in the bosses or bearings Q with which latter are connected the forks R of the vehicle-frame. The limbs G and noses H continuous thereof are integral with the bodies of the cranks F, so that the cranks proper and the hub member comprise but three pieces, but they are bound together as a single piece construction.

It will now be seen that when the parts are assembled as in Fig. 1 and the nut N is tightened, the cranks are tightly wedged with the shoulders B and consequently with the hub member, forming a compact and comparatively rigid union therewith, and consequently of the device, with less weight and reduced expense than heretofore. When the screw or bolt N is withdrawn and the cranks moved laterally, the hub member and the appurtenances of the wheel may be removed without dismembering or disturbing the other parts of the frame or vehicle.

Having thus described my invention what I claim as new and desire to secure by Letters Patent, is:—

1. In a hub, a hub-member proper, and a crank having on its horizontal limb a nose which is adapted to be interlocked with an end of said hub member proper, said nose, limb and the vertical limb of said member being of integral construction.

2. In a hub, a tubular hub-member proper, and a crank having on its horizontal limb a nose exteriorly of angular form, said hub member having in its end a socket of angular form, the same interlockingly receiving said nose, a bolt adapted to be passed through the limbs of the crank, said nose and said hub member, and means for tightening said bolt in its position.

3. In a hub, a tubular hub member proper, the same having on an end thereof a shoulder whose exterior is angular and whose interior comprises an angular socket, a crank having on its horizontal limb a nose whose exterior is angular and is adapted to enter and interlock with said socket, a tightening bolt adapted to pass through said crank, the nose thereof and said hub member proper, and a spoke-carrying sleeve which is interlockingly fitted on the exterior of said shoulder.

WILLIAM T. PURSGLOVE.

Witnesses:
JOHN A. WIEDERSHEIM,
C. D. MCVAY.